US010244689B2

United States Patent
van der Merwe

(10) Patent No.: US 10,244,689 B2
(45) Date of Patent: Apr. 2, 2019

(54) SOILLESS PLANT CULTIVATING CONTAINER

(71) Applicant: E-SMARTS GLOBAL LICENSING LTD, Ebene (MU)

(72) Inventor: Pieter Gideo van der Merwe, Pretoria (ZA)

(73) Assignee: E-SMARTS GLOBAL LICENSING LTD, Ebene (MU)

( * ) Notice: Subject to any disclaimer, the term of this patent is extended or adjusted under 35 U.S.C. 154(b) by 0 days.

(21) Appl. No.: 15/038,923

(22) PCT Filed: Apr. 24, 2015

(86) PCT No.: PCT/ZA2015/000028
§ 371 (c)(1),
(2) Date: May 24, 2016

(87) PCT Pub. No.: WO2016/138544
PCT Pub. Date: Sep. 1, 2016

(65) Prior Publication Data
US 2017/0347545 A1    Dec. 7, 2017

(30) Foreign Application Priority Data
Feb. 23, 2015  (ZA) .................... 2015/1201

(51) Int. Cl.
*A01G 31/00*   (2018.01)
*A01G 31/02*   (2006.01)

(52) U.S. Cl.
CPC ............ *A01G 31/02* (2013.01); *Y02P 60/216* (2015.11)

(58) Field of Classification Search
CPC .......... A01G 9/02; A01G 9/022; A01G 9/023; A01G 31/02; A01G 31/06; A01G 31/00; A01G 9/104; A01G 27/001; A01G 2031/006
See application file for complete search history.

(56) References Cited

U.S. PATENT DOCUMENTS

| | | | |
|---|---|---|---|
| 4,389,813 A | 6/1983 | Jaques et al. | |
| 5,276,997 A * | 1/1994 | Swearengin | A01G 9/022 47/48.5 |

(Continued)

FOREIGN PATENT DOCUMENTS

| | | |
|---|---|---|
| CN | 92/15194 | 9/1992 |
| CN | 104206199 | 12/2014 |

(Continued)

OTHER PUBLICATIONS

Notification of Reasons for Refusal dated Aug. 1, 2017, from corresponding Japanese Application No. 2016-541245, along with an English translation.

(Continued)

*Primary Examiner* — Trinh T Nguyen
(74) *Attorney, Agent, or Firm* — Knobbe Martens Olson & Bear, LLP

(57) ABSTRACT

A soilless plant cultivating container includes an elongate body of generally wave shaped form and having a flow channel defined therethrough; and a receptacle defined in a sidewall of the body in fluid communication with the flow channel to receive and support a plant therein.

15 Claims, 9 Drawing Sheets

(56) References Cited

U.S. PATENT DOCUMENTS

| | | | | |
|---|---|---|---|---|
| 5,533,302 A | * | 7/1996 | Lynch | A01G 9/023 47/66.5 |
| 5,724,768 A | * | 3/1998 | Ammann, Jr. | A01G 31/02 47/59 R |
| 6,840,008 B1 | * | 1/2005 | Bullock | A01G 9/023 47/82 |
| 7,055,282 B2 | * | 6/2006 | Bryan, III | A01G 31/06 47/62 R |
| 2003/0089037 A1 | | 5/2003 | Ware | |
| 2012/0167460 A1 | | 7/2012 | Omidi | |
| 2013/0118074 A1 | | 5/2013 | Fulbrook | |
| 2014/0083007 A1 | | 3/2014 | Galvan | |

FOREIGN PATENT DOCUMENTS

| | | |
|---|---|---|
| JP | 1-247023 | 10/1989 |
| JP | 2004-154084 | 6/2004 |
| TW | 492607 | 1/2015 |

OTHER PUBLICATIONS

Korean Office Action dated Apr. 25, 2018, of corresponding Korean Application No. 10-2016-7016018, along with an English translation.

European Search Report dated Jul. 26, 2018, from corresponding European Application No. 15866386.4.

* cited by examiner

SOILLESS PLANT CULTIVATING CONTAINER

TECHNICAL FIELD

This disclosure relates to soilless plant cultivating containers for soilless cultivation of plants, more specifically, to soilless containers for high density cultivation of plants in a general vertically orientation relative to a ground surface.

BACKGROUND

Soilless growing systems where plants such as vegetables are cultivated by exposure to constant supply of nutrient containing fluid are known. Some of the problems associated with such commonly known soilless plant cultivating containers and/or tubes are that the nutrient rich fluid tends to escape through the planting holes in the containers, especially when orientated substantially vertically relative to a ground surface and, as a result of the rich nutrient levels, causes overgrowing of unwanted algae on the outer surface of the containers and/or tubes.

Another problem associated with soilless cultivation of plants is due to the constant exposure of roots to fluid. This means that little or no oxygen is available for uptake by the plant roots. Oxygen is an essential plant nutrient and plant root systems require oxygen for aerobic respiration, an essential plant process that releases energy for root growth and nutrient uptake. Injury from low (or no) oxygen in the root zone can take several forms and differs in severity between plant types.

Soilless plant systems are associated with high capital investment, thus, the higher the density of plants per square meter in a typical soilless greenhouse type environment, the better the financial returns on investment.

SUMMARY

I provide:

A soilless plant cultivating container including:
an elongate body of generally wave shaped form and having a flow channel defined therethrough; and
a receptacle defined in a sidewall of the body in fluid communication with the flow channel to receive and support a plant therein.

A container that may be made of synthetic material.

A container that may be of general rectangular form in cross section.

A container that may be a dark color.

A container that may include two symmetric elongate halves to be assembled together to define the container.

A container wherein a sealing formation may extend longitudinally along the container to seal off a space defined in between the two symmetric halves when assembled.

A container that may further include securing formations that secure the symmetric halves together when assembled.

A container wherein the elongate body may include a channeling device that channels fluid flowing down the flow channel toward the receptacle.

A container wherein the channeling device may include v-shaped ridges extending from an inner surface of the elongate body.

A container wherein the elongate body may include a disperser that disperses fluid received from the channeling device.

A container wherein the disperser may be a protrusion extending from the inner surface of the elongate body.

A container wherein the elongate body may include a pair of guiding formations arranged on opposing peripheral regions thereof that guide an overflow of fluid out of the receptacle, towards the flow channel.

A container wherein the elongate body may include an air passage in fluid communication with the receptacle to introduce temperature and oxygen regulated air to the receptacle.

A container wherein the air passage may be a pair of passages extending longitudinally along the body on opposing peripheral regions thereof.

A container wherein the elongate body may include engagement formations defined on end regions thereof to allow coupling of a plurality of soilless plant cultivating containers together to thereby define a soilless plant cultivating pipe.

A container wherein the receptacle may be angularly disposed relative to the vertical axis of the elongate body.

A container wherein a plurality of receptacles may be arranged out of register relative to one another on opposing outer surfaces of the body.

A container wherein the receptacle may be located in a concave region of the elongate body.

A container wherein the receptacle may include spacing formations that space the plant substantially centrally in the receptacle.

A soilless plant cultivating container including:
a body having a flow channel defined therethrough;
an arm extending at an angle of 1 to 179 degrees away from the body; and
a receptacle defined on an opposing region of the arm to receive and support a plant therein, wherein the body, arm and receptacle are in fluid communication with one another to allow fluid received by the receptacle to flow downstream of the arm towards the body.

A container wherein the receptacle may include a spacer element that spaces the plant substantially centrally therein.

A container that may further include a basket element shaped and sized to complementarily fit into the receptacle.

DETAILED DESCRIPTION

Figure 1:
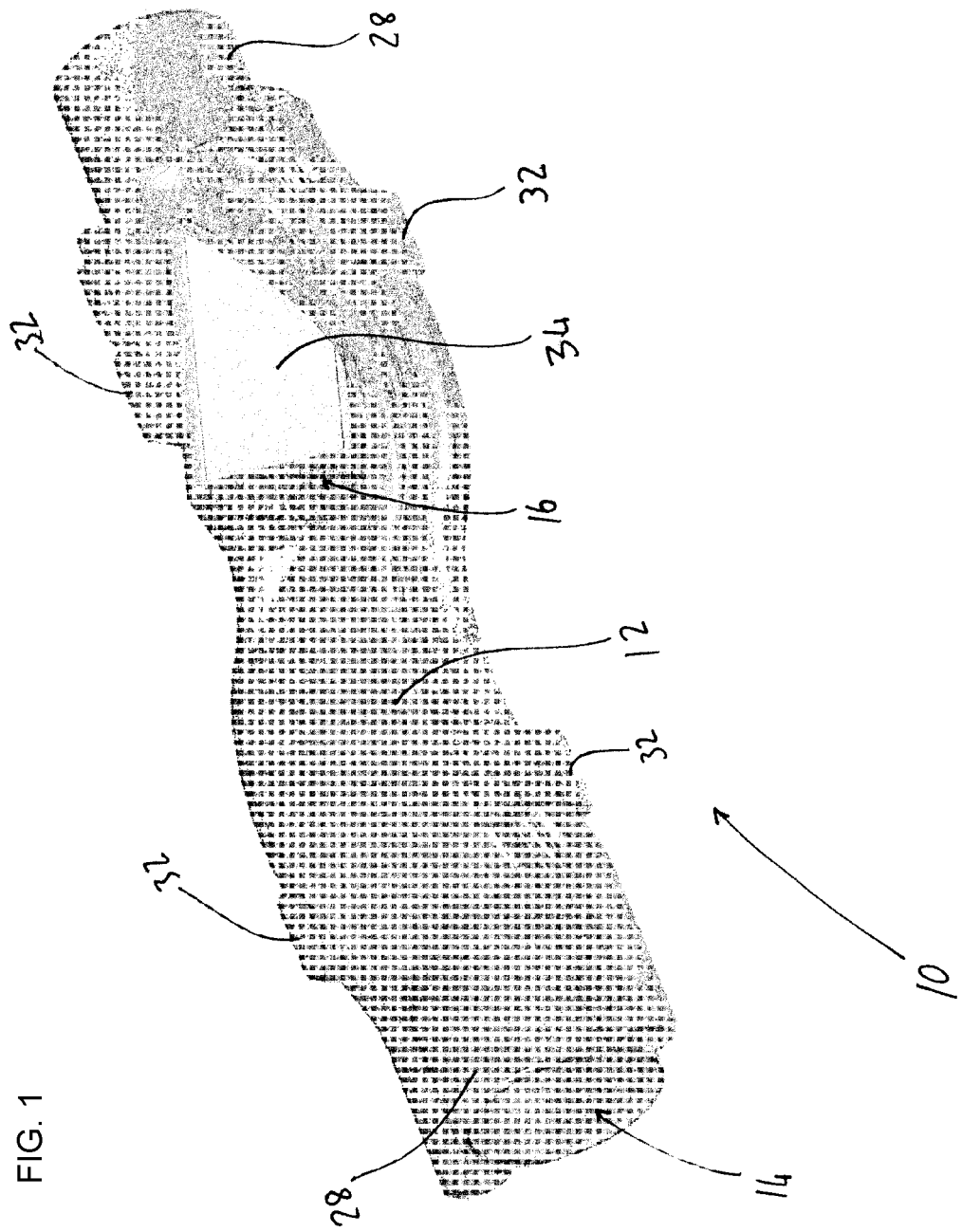
FIG. 1 shows a perspective top view of a first example of the soilless plant cultivating container.
Figure 2:
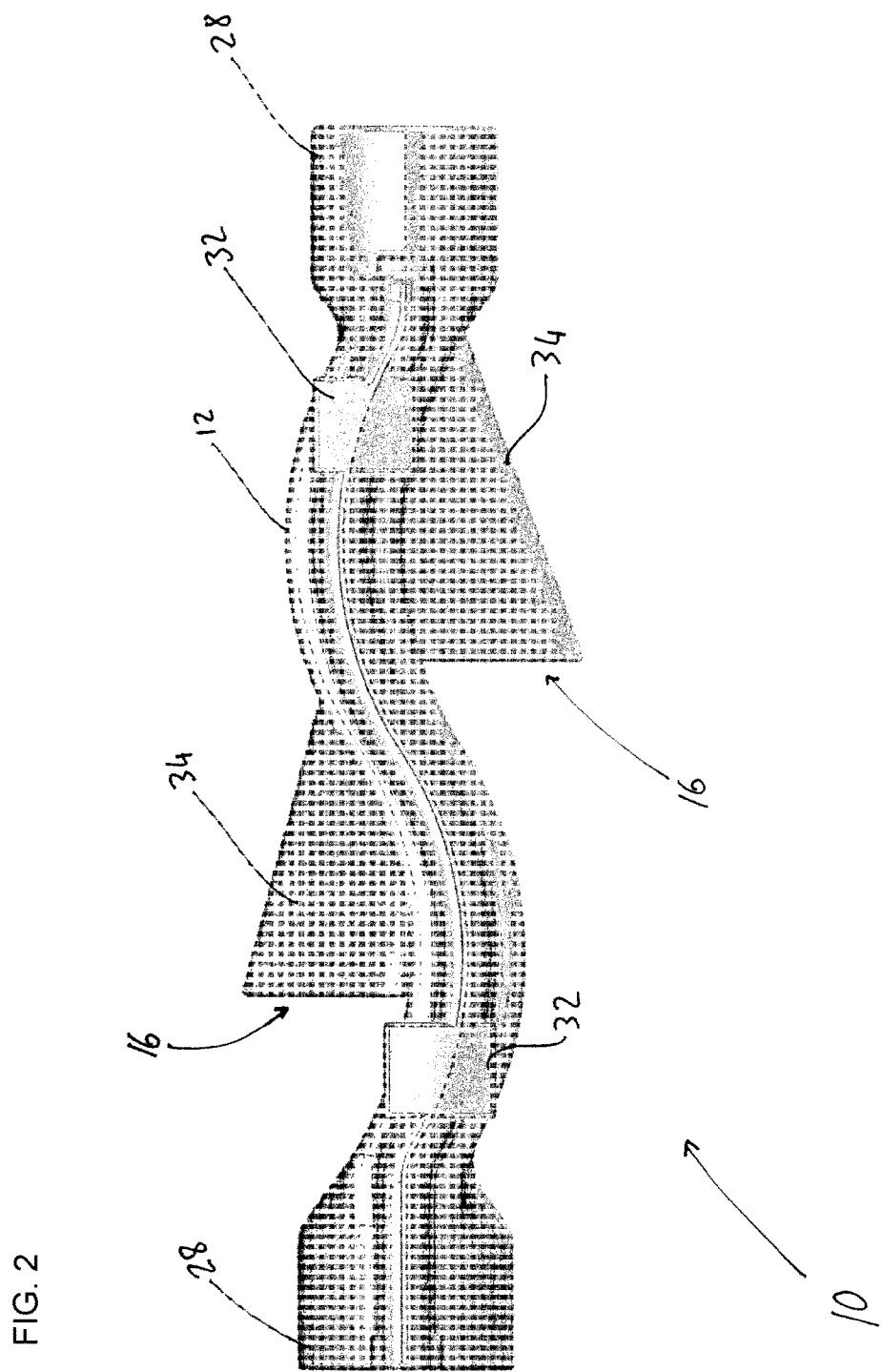
FIG. 2 is a side view of the container as shown in FIG. 1.
Figure 3:
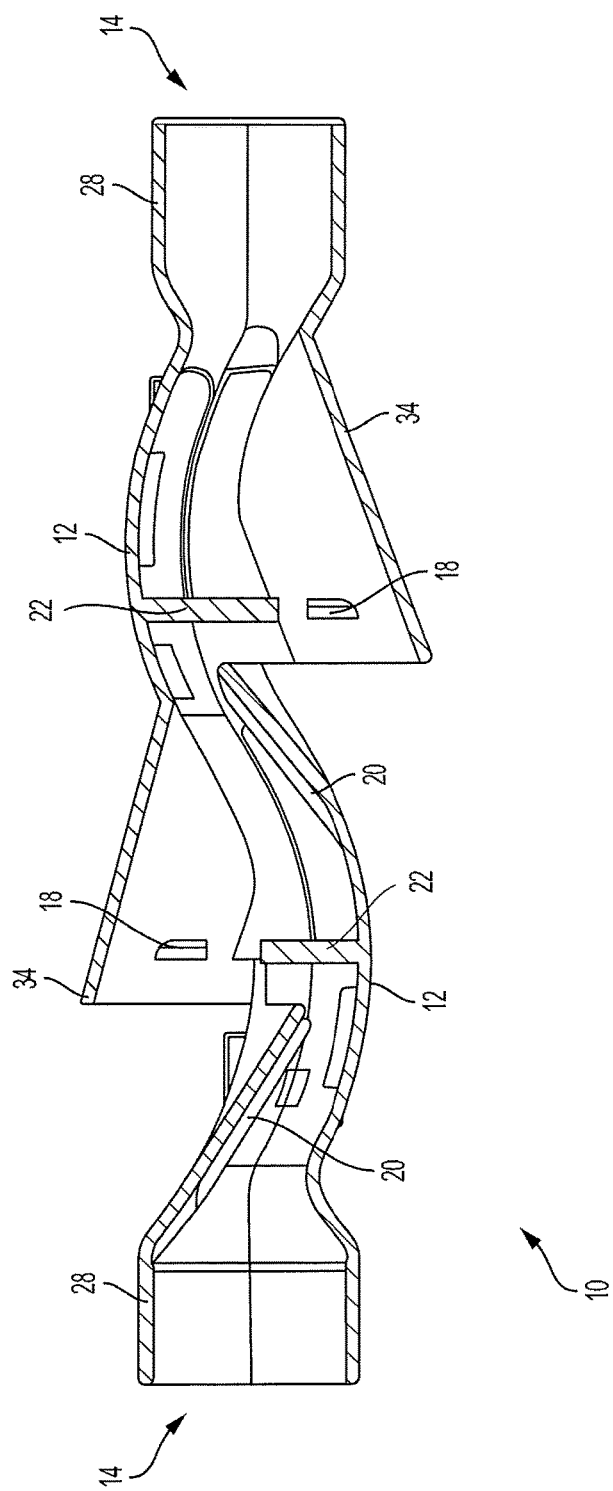
FIG. 3 is a cross-sectional side of the container as shown in FIGS. 1 and 2.
Figure 4:
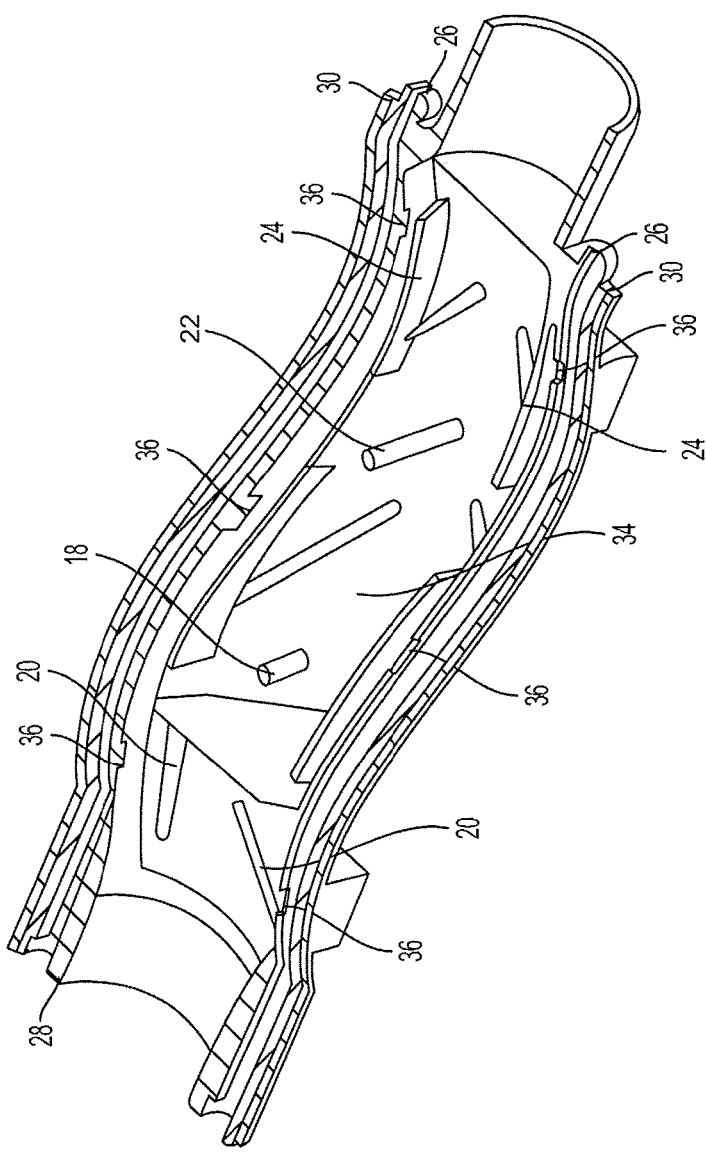
FIG. 4 is a perspective top view of one symmetrical half of the container as shown in FIGS. 1 to 3.

I provide a soilless plant cultivating container including:
an elongate body of generally wave shaped form having a flow channel defined therethrough; and
at least one receptacle defined in a sidewall of the body in fluid communication with the flow channel to receive and support a plant therein, wherein the receptacle is angularly disposed to the vertical axis of the body.

The body may be manufactured from suitable plastics and/or synthetic materials. The body may be of general rectangular form, in cross section. The body may be of any suitable dark color.

The soilless plant cultivating container may comprise two symmetric elongate halves to be assembled together to define the container.

A sealing arrangement comprising a sealing channel that complementarily receives a seal element therein may extend longitudinally along the soilless plant cultivating container to seal off a space defined in-between the two symmetric halves when in assembled mode.

Securing formations may further be provided to secure the assembled halves together in assembled mode.

The receptacle may include spacing formations extending inwardly from an upper end region thereof to space the plant away from the inner surface of the receptacle.

The spacing formations may be in the form of protrusions extending from an inner surface of the receptacle.

The receptacle will typically be located in a concave region of the wave shaped body. A plurality of receptacles will typically be orientated out of register relative to one another on opposing surfaces of the soilless plant cultivating container.

The body may further include a channeling device that channels fluid streaming downward along the flow channel toward the plant roots of the plant contained in the receptacle. The channeling device may be in the form of v-shaped ridges extending from an inner surface of the body.

The body may also include a disperser element extending from the inner surface thereof to disperse fluid received from the channeling device.

The disperser element may be of any suitable shape and size and may be located below the v-shaped ridges. The disperser element may take the form of a pin extending substantially orthogonally away from the inner surface.

To prevent overflow of fluid out of the receptacle in instances when the receptacle becomes overgrown with plant root material, guiding formations are provided to guide fluid out of the receptacle towards the flow channel.

The guiding formations may take the form of a pair of channels defined on opposing peripheral regions of the receptacle, the guiding formations extending substantially vertically.

To promote exposure of the plant roots to oxygen, as well as to control the temperature inside the receptacle surrounding the plant roots, an air passage that introduces air from outside of the body to the plant roots is provided.

The air passage may be arranged longitudinally along the body on a peripheral region thereof. The air passage may include slot formations to allow the flow of air out of the passage, toward the receptacle, and thereby the plant roots.

Engagement formations defined on end regions of the body may be provided to allow coupling of a plurality of soilless plant cultivating containers together thereby defining a soilless plant cultivating pipe.

The engagement formations may take the form of male and female engagement formations, shaped and sized to sealably couple with one another to inhibit escape of fluid out of the soilless cultivating pipe, when assembled.

I also provide a soilless plant cultivating container including:
  a body having a flow channel defined therethrough;
  an arm extending at angle of 1 to 179 degrees away from the body; and
  a receptacle defined at an opposing region of the arm to receive and support a plant therein, wherein the body, arm and receptacle are in fluid communication with one another to allow fluid received by the receptacle to flow downstream along the arm towards the body.

The soilless plant cultivating container may be manufactured from suitable plastics and/or synthetic materials and may be of any suitable dark color.

The soilless plant cultivating container may comprise two symmetric halves to be assembled together to define the container.

A sealing arrangement comprising a sealing channel to complementarily receive a sealing element therein may extend longitudinally along the soilless plant cultivating container to seal off a space defined in-between the two symmetric halves when in assembled mode.

Securing formations may further be provided to secure the assembled halves together when in assembled mode.

The receptacle may include spacing formations extending inwardly from an upper end region thereof to space the plant away from inner surface of the receptacle.

The spacing formations may be in the form of protrusions extending from an inner surface of the receptacle. The spacing formation may be in the form of a spacer element shaped and sized to be complementarily fit in the receptacle.

The receptacle may be shaped and sized to in turn complementarily receive a basket type element therein, which basket type element is configured to receive a seedling plug. The basket type element may be perforated to allow roots of the seedling plug to extend therethrough towards the arm.

The body may have engagement formations defined on end regions thereof to allow coupling of a plurality of soilless plant cultivating containers together, thereby defining a soilless plant cultivating pipe.

The engagement formations may take the form of male and female engagement formations, shaped and sized to sealably couple with one another to inhibit escape of fluid out of the soilless cultivating pipe, when assembled.

It should be appreciated that "plant" is to be interpreted to include any plant-like propagation matter such as seedlings, bulbs, seeds and the like.

Referring to the drawings, a preferred example of the soilless plant cultivating container is generally depicted by reference numeral 10.

In accordance with a first example more clearly illustrated in FIGS. 1 to 4, the soilless plant cultivating container 10 includes an elongate body 12 of generally wave shaped form, having a flow channel 14 defined therethrough, a receptacle 16 defined in a sidewall of the body 12 to receive and support a plant therein, spacing formations 18 to space the plant relatively centrally in the receptacle 16, a channeling device in the form of v-shaped ridges 20 to channel fluid toward the receptacle and thereby to the plant roots contained therein, a disperser element 22 to disperse fluid received from the channeling device, guiding formations 24 to guide an overflow of fluid out of the receptacle 16 towards the flow channel 14, an air passage 26 to allow flow of oxygen and/or temperature regulated air from outside of the body 12 toward the receptacle and engagement formations 28 defined on end regions of the body 12 to allow coupling of a plurality of soilless plant cultivating containers 10 together to define a soilless plant cultivating pipe (not shown).

The container 10 can be manufactured from any suitable plastics and/or synthetic material and can be of any suitable geometrical shape and size, preferably of general rectangular form, in cross section.

The container 10 further comprises two symmetric elongate halves 28 to be assembled to define the container 10.

A sealing channel 30 shaped and sized to complementarily receive a sealing element (not shown) therein seals off a space in-between the two symmetric halves when assembled.

Securing formations 32 are further provided to secure the symmetrical halves together when assembled.

The receptacle 16 includes an aperture defined in the sidewall of the body 12, and a supporting surface 34 angularly disposed relative to the body 12.

The spacing formations 18 that secure the plant substantially centrally in the receptacle away from the inner surfaces thereof are in the form of protrusions extending inwardly from an inner surface of the supporting surface 34 of the receptacle 16.

The receptacles are in fluid communication with the flow channel so that, in use, seedlings are planted in the receptacles with their roots dangling into the flow channel so that the roots can contact a fluid trickling down the flow channel or a gas or a mist in the flow channel.

To achieve a maximum density of plants in a typical greenhouse type structure, a plurality of receptacles 16 is typically orientated out of register relative to one another on opposing outer surfaces of the body 12.

To facilitate the desirable downstream flow of fluid in the body 12, the receptacle 16 is typically located in a concave region of the wave shaped body 12.

The disperser element 22 typically extends substantially orthogonally away from the inner surface of the body 12.

Guiding formations 24 that guide an overflow of fluid out of the receptacle 16 towards the flow channel 14 can take the form of a pair of elongate ridges extending from the inner surface of the body, parallel orientated relative to each other in a general vertical orientation relative to a ground surface. The guiding formations 24 facilitate the flow of fluid out of the receptacle 16 into the flow channel 14 in instances where the normal flow of fluid is obstructed by plant roots. Such prevention of overflow of nutrient rich fluid inhibits the growth of algae and other non-desirable organisms on the outer region of the body 12.

To control the temperature in the receptacle, especially around the plant roots in the preferred region of 16 to 25° C., air passage 26 and slot formation 36 are provided to allow flow of temperature regulated oxygenated air from outside of the body 12 towards the receptacle and thereby the plant roots contained therein. A pair of air passages 26 typically extend longitudinally along the body 12 on opposing peripheral regions thereof. Slot formations 36 arranged in sidewalls of the air passages 26 facilitate the flow of the temperature regulated oxygenated air towards the receptacle 16, and thereby the plant roots. Air of the required temperature is intermittently introduced through the passage via the slots 36 to promote maximum plant growth.

Engagement formations 28 defined on end regions of the body 12 allow coupling of a plurality of soilless plant cultivating containers 10 together, thereby defining a soilless plant cultivating pipe. The engagement formations 28 typically includes male and female engagement formations, shaped and sized to sealably couple with one another to inhibit escape of fluid out of the soilless cultivating pipe, when assembled.

Figure 5:
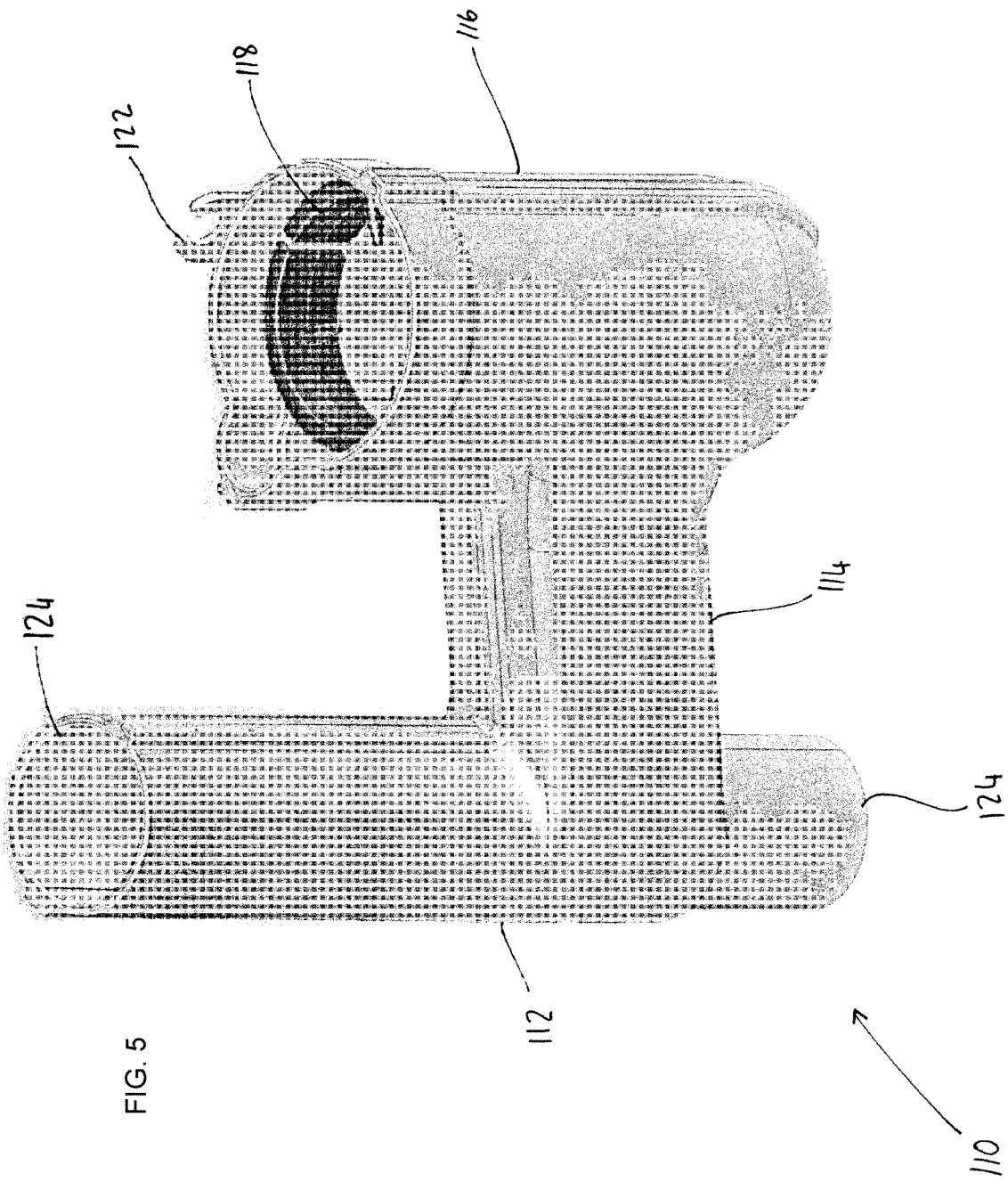
FIGS. 5 and 6 show perspective views of a second example of a soilless plant cultivating container.
Figure 6:
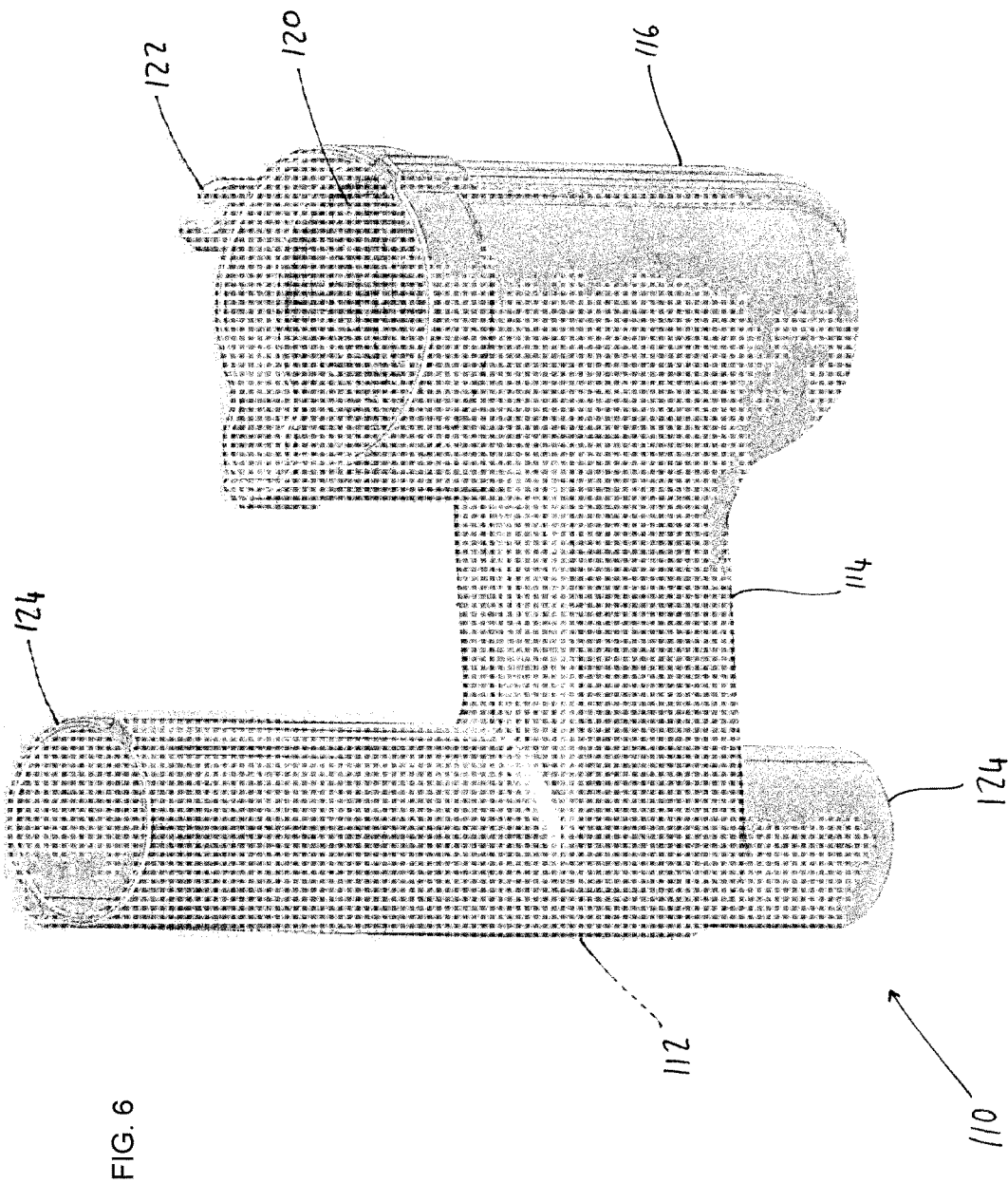

Turning now to FIGS. 5 and 6, in accordance with a second example, the soilless plant cultivating container 110 includes a body 112, an arm 114 extending at angle of 1 to 179 degrees away from the body 112 and a receptacle 116 defined at an opposing end region of the arm 114 to receive and support a plant therein, wherein the receptacle 116, arm 114 and the body 112 is in fluid communication with one another to allow fluid received by the receptacle 116, to flow downstream the arm 114 towards the body 112.

The body 112 can be manufactured from suitable plastics and/or synthetic materials and can be of any suitable dark color.

The container 110 can comprise two symmetric halves to be assembled together to define the container 110.

Figure 9:
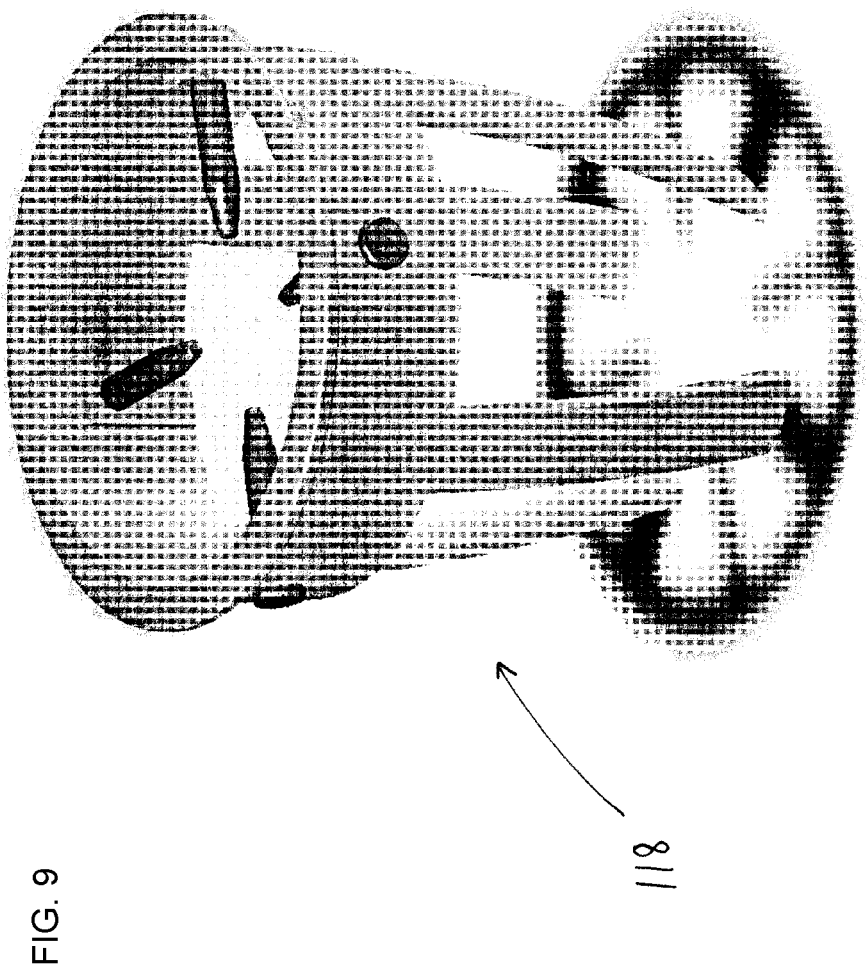
FIG. 9 is an illustration of the spacer element for use with the second example.

Spacer element 118 provides for spacing the plant substantially centrally and away from the inner surface region of the receptacle 116 as shown in FIG. 9.

Figure 7:
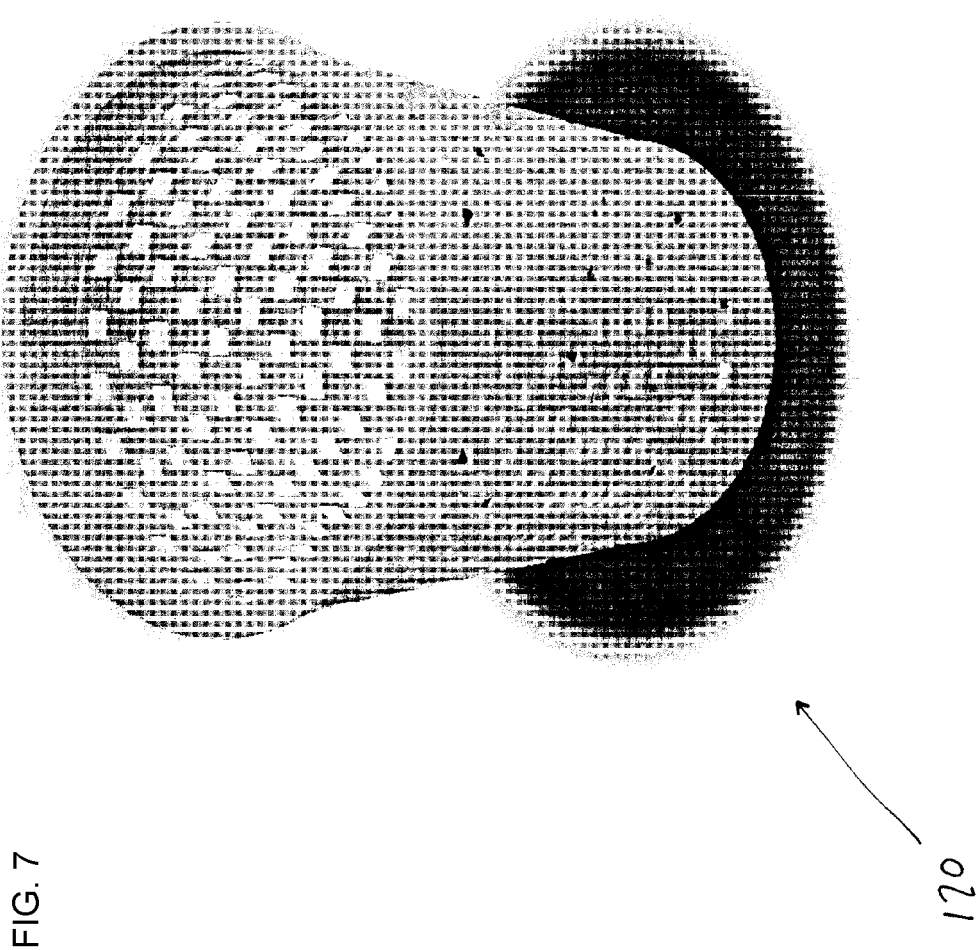
FIGS. 7 and 8 are perspective and top views, respectively, of a basket type element to be used with the second example.
Figure 8:
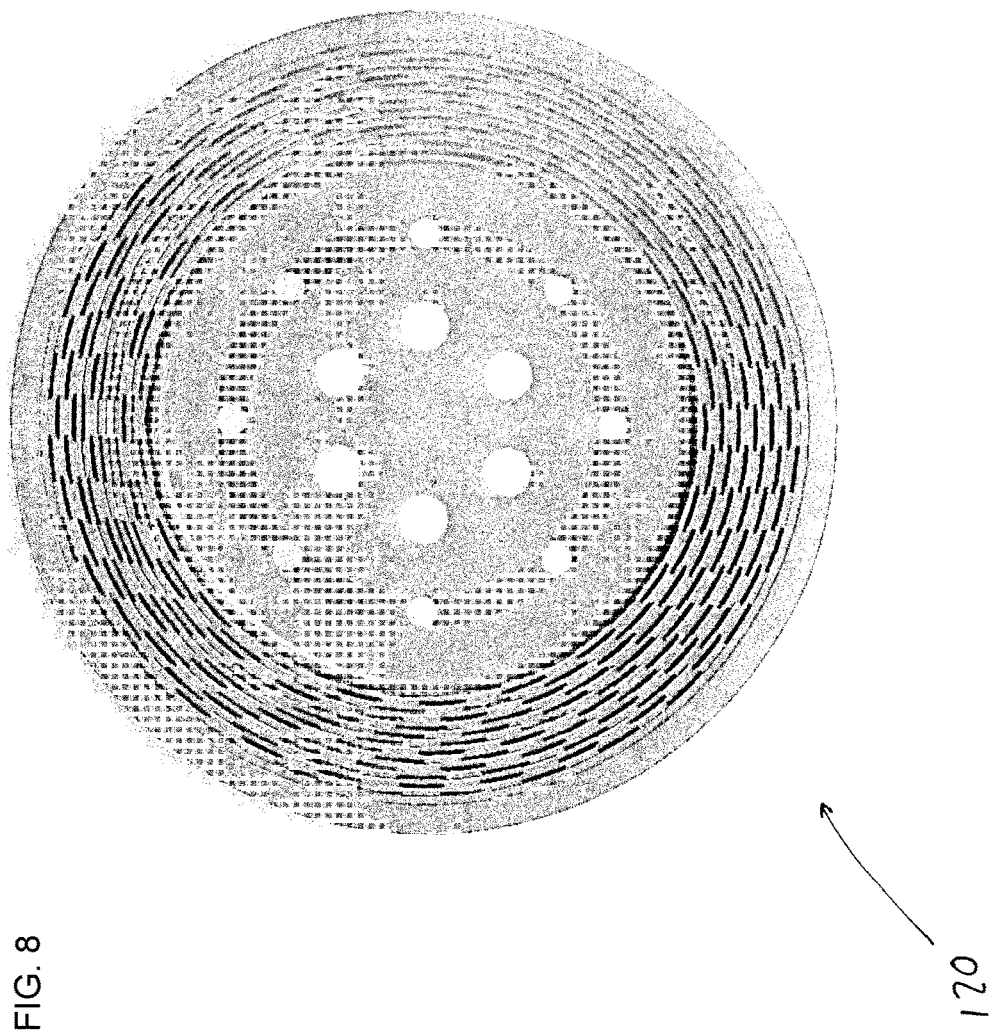

The receptacle 116 can be shaped and sized to in turn complementarily receive a perforated basket type element 120 therein as shown in FIGS. 7 and 8, shaped and sized to receive a seedling plug therein.

The receptacle 116 further includes a securing formation 122 to receive and secure a fluid source to the receptacle to trickle a nutrient enriched fluid to the receptacle 116 for absorption by the plant roots.

Engagement formations 124 are defined on end regions of the body 112 to allow coupling of a plurality of soilless plant cultivating containers 110 together to define a soilless growing pipe typically for use in a greenhouse type structure.

My containers are advantageous in that a soilless container for the cultivation of plants manipulates the flow of fluid inside the container to maximize the availability of nutrient rich fluid to the plant roots. Further, inclusion of the air passages allows a user to control the ambient temperature as well as the availability of oxygen in the receptacle surrounding the plant roots. The arrangement of receptacles on opposing outer surfaces of the container maximises the density of plants to be cultivated.

It will be apparent to those skilled in the art that various changes and modifications may be made to the preferred examples described, and that those changes and modifications shall not be interpreted in departing from the general scope and spirit of this disclosure.

The invention claimed is:

1. A soilless plant cultivating container comprising:
an elongate body of wave shaped form and having a flow channel defined therethrough;
a receptacle defined in a sidewall of the body in fluid communication with the flow channel to receive and support a plant therein, and
the elongate body further including an air passage arranged separate from the flow channel and extending longitudinally therealong, the air passage being in fluid communication with the receptacle for introducing temperature and oxygen regulated air to the receptacle.

2. The container as claimed in claim 1, wherein the container is of substantially rectangular form in cross section.

3. The container as claimed in claim 1, wherein the container comprises two symmetric elongate halves adapted to be assembled together to define the container.

4. The container as claimed in claim 3, further comprising a sealing formation extending longitudinally along the container to seal off a space defined in between the two substantially symmetric halves when assembled.

5. The container as claimed in claim 3, further comprising securing formations that secure the symmetric halves together when assembled.

6. The container as claimed claim 1, wherein the elongate body includes a channeling device that channels fluid flowing down the flow channel toward the receptacle.

7. The container as claimed in claim 6, wherein the channeling device comprises v shaped ridges extending from an inner surface of the elongate body.

8. The container as claimed in claim 6, wherein the elongate body includes a disperser that disperses fluid received from the channeling device.

9. The container as claimed in 8, wherein the disperser is a protrusion extending from the inner surface of the elongate body.

10. The container as claimed in claim 1, wherein the elongate body includes a pair of guiding formations arranged on opposing peripheral regions thereof that guide an overflow of fluid out of the receptacle, towards the flow channel.

11. The container as claimed claim 1, wherein the elongate body includes engagement formations defined on end regions thereof to allow coupling of a plurality of soilless plant cultivating containers together to thereby define a soilless plant cultivating pipe.

12. The container as claimed in claim 1, wherein the receptacle is angularly disposed relative a vertical axis of the elongate body.

13. The container as claimed in claim 1, wherein a plurality of receptacles are arranged out of register relative to one another on opposing outer surfaces of the body.

14. The container as claimed in claim 1, wherein the receptacle is located in a concave region of the elongate body.

15. The container as claimed in claim 1, wherein the receptacle includes spacing formations that space the plant substantially centrally in the receptacle.

\* \* \* \* \*

UNITED STATES PATENT AND TRADEMARK OFFICE
CERTIFICATE OF CORRECTION

PATENT NO. : 10,244,689 B2
APPLICATION NO. : 15/038923
DATED : April 2, 2019
INVENTOR(S) : Pieter Gideo Van Der Merwe Page 1 of 1

It is certified that error appears in the above-identified patent and that said Letters Patent is hereby corrected as shown below:

In the Claims

Column 6 Line 62, Claim 6, after "claimed" insert --in--.

Column 6 Line 66, Claim 7, change "v shaped" to --v-shaped--.

Column 7 Line 4, Claim 9, change "8," to --claim 8,--.

Column 7 Line 12, Claim 11, after "claimed" insert --in--.

Signed and Sealed this
Thirtieth Day of July, 2019

Andrei Iancu
*Director of the United States Patent and Trademark Office*